Patented Oct. 10, 1933

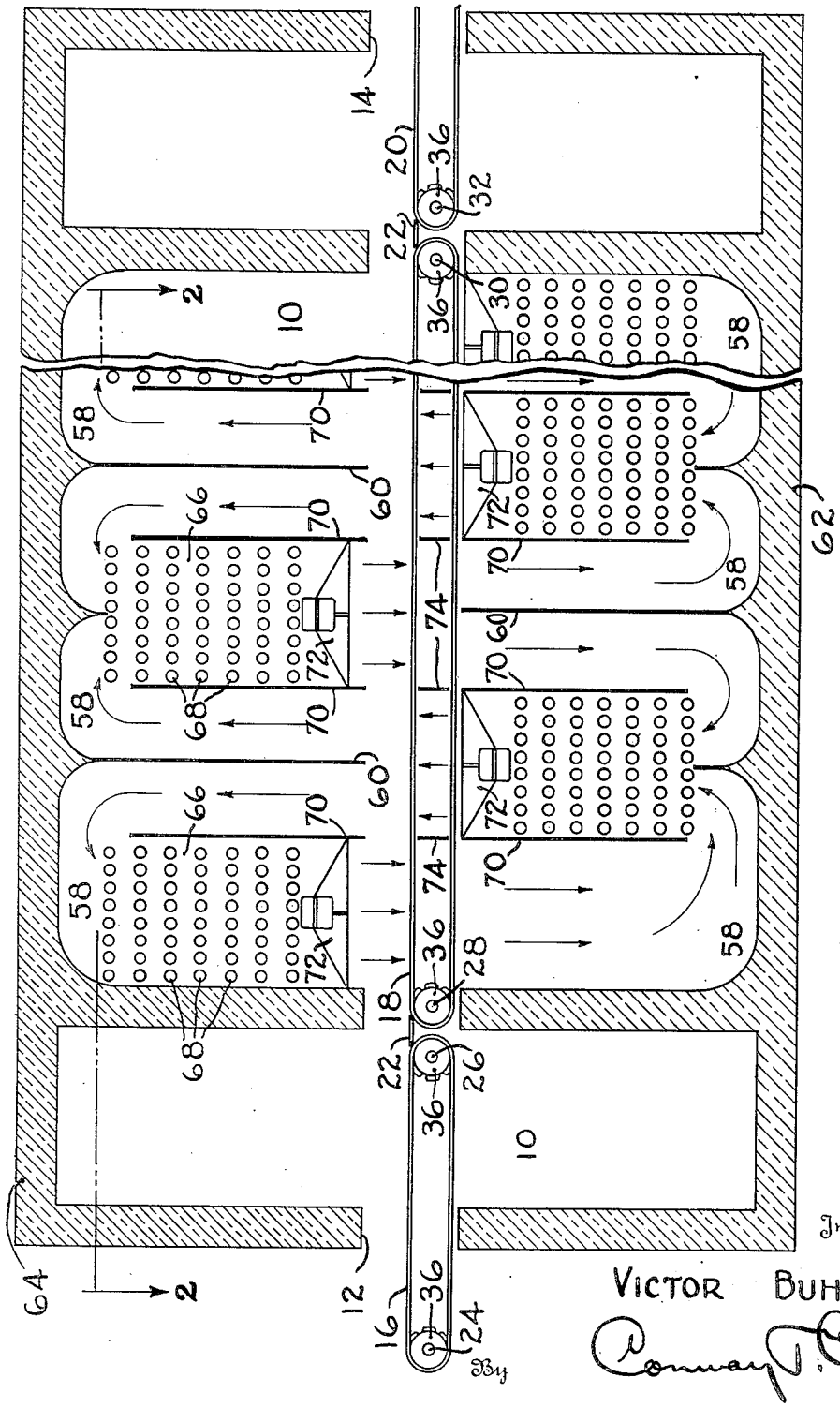

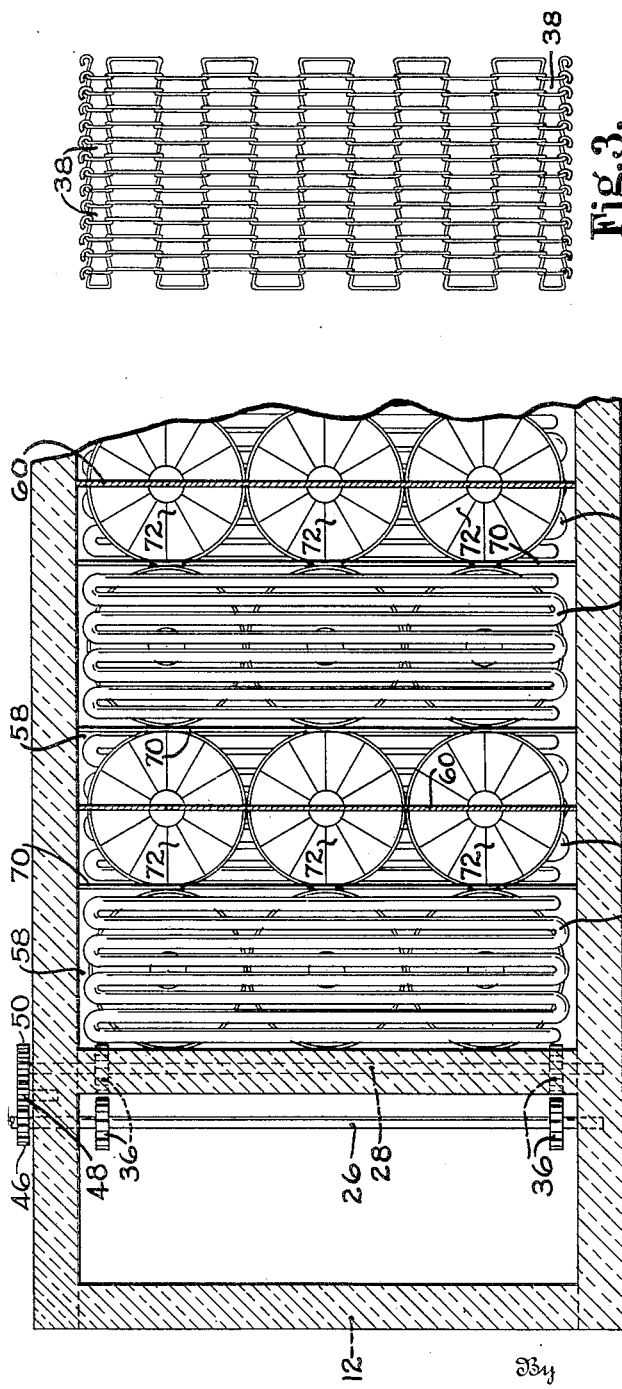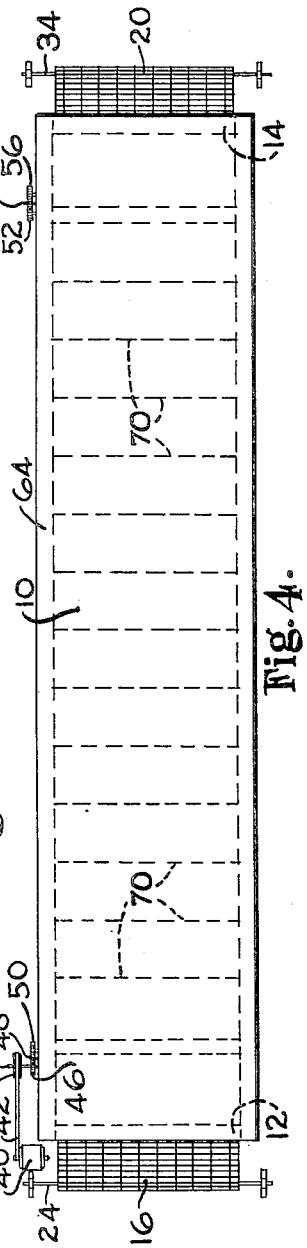

1,930,414

UNITED STATES PATENT OFFICE 1,930,414

REFRIGERATING APPARATUS

Victor Buhr, Larchmont, N. Y.

Application November 29, 1932
Serial No. 644,872

3 Claims. (Cl. 62—102)

This invention relates to a refrigerating method and apparatus, and more particularly it relates to an improved method and means for quickly hardening ice cream and other frozen products. While the invention is intended for use particularly for the refrigeration of material already packaged in the container in which it is to be marketed, for instance, ice cream and fruit juices, it is suitable also for use with material which is to be refrigerated in molds from which it is to be removed before marketing, or with such material as may not necessitate the use of a container, for instance, fruit in the natural state, compressed meat, compressed fish or cuts of meat.

Taking ice cream as an example, it is necessary after the ice cream has been made and is in a semi-frozen condition, to place the ice cream in packages, and then to subject the packaged ice cream to a hardening process. Heretofore, this hardening process has required a considerable period of time.

The disadvantages of a slow hardening process are apparent. Manufacturers of ice cream, because of the considerable time required for hardening, often have been unable to supply a particular unexpected demand. On the other hand, if a considerable amount of ice cream is hardened in anticipation of a large demand for a particular occasion, some unexpected circumstances may arise which will materially lessen the amount of ice cream desired for that occasion, leaving the manufacturer with a huge supply of ice cream undisposed of. Moreover, it is a well known fact that ice cream which is slowly hardened does not have the smooth, minute, uniform crystals which are so highly desirable. If an object is frozen instantaneously on all sides the growth of the water crystal is retarded and the danger of the tissue rupture of the meat and fruit with the result of losing juice and flavor, is eliminated.

In my United States Patent No. 1,865,168, granted June 28, 1932, I have disclosed a method and apparatus for quickly hardening frozen products so as to obviate the disadvantages mentioned above. The invention disclosed in the present application is an improvement on my prior invention disclosed in that patent. The improvements in the method and apparatus result in a more rapid hardening than previously possible, and in the case of ice cream, the finished product will have minute and uniform crystals which give it a smooth and fine texture.

When I speak in my specification of packages, I refer broadly to units of material whether or not the same is held in a container. While I prefer to have all the units of the material to be treated in uniform condition, both as to size, material, and container (if one be used) so as to be able readily to regulate the refrigerating process for best results in every unit, it is to be understood that I do not limit my invention to the refrigeration of units which are in uniform condition.

One object of the invention is the provision of an improved method and means for quickly hardening frozen or semi-frozen food products.

Another object of the invention is the provision of an improved method and means for producing and directing a path of cooling gas under pressure against the product to be hardened whereby the freezing time required is materially reduced.

The invention has for a further object the provision of means for conveying packages of material through a refrigerating chamber and submitting them while in the chamber to a continuous and complete path of cooling gas, such as air, which is alternately directed against opposite surfaces of the package.

These and other objects of the invention will become more apparent from the following description when read in connection with the accompanying drawings and will be pointed out in the appended claims.

In the drawings, which by way of example illustrate one embodiment of an apparatus in accordance with my invention, Fig. 1 is a schematic lengthwise vertical cross section of such apparatus;

Fig. 2 is a partial horizontal section on the line 2—2 of Fig. 1, with the conveyor belt removed;

Fig. 3 is a detailed plan view of a portion of the conveyor belt; and

Fig. 4 is a plan view of the apparatus showing the conveyor belt driving mechanism.

A refrigerating chamber 10, having walls of any suitable insulated construction, is provided with an inlet opening 12 at one end and an outlet opening 14 at the other. These openings are of sufficient size to permit the introduction to and removal from the chamber of the material to be refrigerated. As in my Patent No. 1,865,168, the walls of the chamber also may be provided at suitable locations with doors (not shown) to afford access to the interior of the chamber for purposes of cleaning and repair.

The material to be refrigerated is placed on an endless conveyor belt 16 which passes from the outside of the refrigerating chamber 10 through the inlet opening 12 to the inside. The material is then transferred to a second endless conveyor belt 18 which is disposed entirely within the chamber and after it has travelled through the chamber on this belt 18 it is picked up by a third endless conveyor belt 20, the inner end of which is mounted within the refrigerating chamber and the outer end of which extends through the outlet opening to the outside. Suitable plates 22 are positioned so as to bridge over the gaps between the adjacent belt ends and to provide a smooth and continuous passage for the travelling material.

All of these belts described are apertured, foraminated, or of meshed or of other suitable construction so as not to interfere with the free passage of the cooling air or gas which is forced therethrough as will later be described. Each is mounted on suitable shafts 24, 26, 28, 30, 32 and 34 which are provided with sprocket wheels 36 for engaging suitable apertures on the belts such as those indicated by the reference numeral 38 in Fig. 3. The shafts referred to may be driven in any suitable manner, such, for example, as in the manner shown in Fig. 4. In that figure, 40 represents a motor which is connected by a belt 42 to a pulley wheel 44 mounted on the shaft 26. A gear wheel 46 also secured to the shaft 26 drives a second gear wheel 48 which in turn drives gear wheel 50 mounted on the shaft 28. As the belt 18 is thus put in motion, the shaft 30 is turned and gear wheel 52 mounted thereon, through gear wheel 54, turns gear wheel 56 mounted on shaft 32, to drive that shaft, thus driving the belt 20.

The upper and lower portions of the refrigerating chamber 10 are divided into transverse sections 58 which are defined by partitions 60 which extend from side wall to side wall. The partitions which divide the lower portion of the refrigerating chamber extend from the base wall 62 upwardly to a point directly below the conveyor belt 18. Those partitions dividing the upper portion of the chamber extend from the top 64 downwardly to a point above but spaced from a conveyor belt 18 a sufficient distance so as not to interfere with the travel of packages through the chamber.

The transverse sections 58 referred to are arranged in overlapping staggered relation. That is, the section partitions 60 below the conveyor are not in vertical alignment with the section partitions 60 in the upper portion of the conveyor, but if the former were carried upwardly through the conveyor belt, they would divide the upper sections in half. Each of the transverse sections 58 is provided with a refrigerating unit 66 which in the embodiment illustrated comprises a nest of pipes 68 having a refrigerating solution running therethrough. Each refrigerating unit 66 is encased by side walls or plates 70 which extend from side wall to side wall of the refrigerating chamber but which are spaced from the top 64 and bottom wall 63 of the refrigerating chamber 10, to permit the free circulation of air or other cooling gas through the refrigerating unit. Each refrigerating unit 66 is provided with a fan 72 or other suitable means for drawing cold air or gas from the refrigerating unit and for forcing the same against packages travelling on the conveyor belt. It will be noted that the refrigerating units 66 are disposed in staggered relation, the side wall or plate 70 of each unit in the upper portion of the refrigerating chamber being in vertical alignment with the opposite side wall or plate 70 of the next adjacent refrigerating unit in the lower portion of the chamber.

Positioned in the space between the upper and lower travelling sections of the endless conveyor belt 18, and in alignment with the side walls or plates 70 of the refrigerating units, are vertically disposed partitions or strips 74 which extend from side wall to side wall of the refrigerating chamber and which are for the purpose of directing the cooling gas or air against the surface of the packages or articles to be treated.

The operation of the arrangement should now be apparent. Packages or articles to be treated are placed on the conveyor belt 16 and are carried thereby to the conveyor belt 18 on which they travel through the refrigerating chamber to be delivered therefrom by the conveyor belt 20. Cold air or other gas from each refrigerating unit in the upper portion of the refrigerating chamber is forced under pressure by the fan 72 in that unit and directed against the upper and side surfaces of the packages travelling on the conveyor belt directly below said units. The cold air or gas coming from these units then passes through the wire mesh conveyor belt to be separated by one of the partitions 60 in the lower portion of the chamber which defines a transverse section 58. As indicated by the arrows in Fig. 1, half of the cold air thus divided travels downwardly toward the base wall 62 and then to the left and thence upwardly into the adjacent refrigerating unit while the other half travels a like course but is directed to the refrigerating unit to the right of the partition.

All of the refrigerating units in the lower portion of the chamber direct cold air or gas under pressure upwardly through the conveyor belt 18 and guided by the strips 74, against the lower surfaces of the packages to be treated. The cold air or gas from the refrigerating units in the lower part of the chamber then passes upwardly to be divided by partitions 60 defining the transverse sections 58 in the upper portion of the device and follows paths similar to those just described in connection with the lower portion of the chamber and as indicated by the arrows.

It will be noted that due to this particular arrangement there is a continuous circulation of the cooling gas through the apparatus. This continuous circulation of the cooling gas which alternately is forced under pressure so as to impinge against the opposite surfaces of the packages to be treated assures an even and quick hardening or freezing of the packages or articles to be treated, and, in the case of ice cream, results in a smoother more even textured product.

Having described my invention, what I claim as new and desire to secure by Letters Patent of the United States is:

1. In a refrigerating apparatus, a substantially closed refrigerating chamber, an apertured conveyor within said chamber, refrigerating units above and below the conveyor, said refrigerating units being arranged in staggered relation, and means for forcing a gaseous cooling medium from the refrigerating units alternately against the upper and lower surfaces of products supported on the conveyor.

2. In a refrigerating apparatus, a substantially closed refrigerating chamber, an apertured conveyor within said chamber, refrigerating units within said chamber above and below the conveyor, said refrigerating units being arranged in staggered relation, and fans for forcing a gaseous cooling medium under pressure from refrigerating units against the products on the conveyor, whereby the upper and lower surfaces of said products will alternately be treated by the cooling medium.

3. In a refrigerating apparatus, a substantially closed refrigerating chamber, an apertured conveyor within said chamber, refrigerating units within said chamber above and below the conveyor, said refrigerating units being arranged in staggered relation, means associated with each unit for forcing a gaseous cooling medium under pressure from each unit against the material on the conveyor, and dividing and directing means for directing the cooling medium from each unit after it has passed through said conveyor through at least one refrigerating unit on the opposite side of said conveyor.

VICTOR BUHR.

Patent No. 1,930,414  Granted October 10, 1933

VICTOR BUHR

The above entitled patent was extended April 24, 1951, under the provisions of the act of June 30, 1950, for 5 years and 152 days from the expiration of the original term thereof.

*Commissioner of Patents.*